(12) United States Patent
Jung et al.

(10) Patent No.: US 12,388,919 B2
(45) Date of Patent: Aug. 12, 2025

(54) CAMERA STRUCTURE AND ELECTRONIC DEVICE COMPRISING CAMERA STRUCTURE

(71) Applicant: SAMSUNG ELECTRONICS CO., LTD., Suwon-si (KR)

(72) Inventors: Minsu Jung, Suwon-si (KR); Yoonyoung Hwang, Suwon-si (KR); Gyeongtae Kim, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 18/095,168

(22) Filed: Jan. 10, 2023

(65) Prior Publication Data
US 2023/0164251 A1 May 25, 2023

Related U.S. Application Data

(63) Continuation of application No. PCT/KR2021/009116, filed on Jul. 15, 2021.

(30) Foreign Application Priority Data

Jul. 21, 2020 (KR) ........................ 10-2020-0090154

(51) Int. Cl.
*H04M 1/20* (2006.01)
*H04M 1/02* (2006.01)
(Continued)

(52) U.S. Cl.
CPC .......... *H04M 1/0264* (2013.01); *H04N 23/57* (2023.01); *H04N 23/685* (2023.01); *H04N 23/90* (2023.01)

(58) Field of Classification Search
CPC .. H04M 1/0264; H04M 1/0283; H04N 23/57; H04N 23/685; H04N 23/90; H04N 23/45;
(Continued)

(56) References Cited

U.S. PATENT DOCUMENTS

| 8,610,822 B2 | 12/2013 | Weber et al. |
| 9,726,847 B2 * | 8/2017 | An ............................ G02B 7/02 |

(Continued)

FOREIGN PATENT DOCUMENTS

| CN | 107241466 | 10/2017 |
| CN | 209105310 | 7/2019 |

(Continued)

OTHER PUBLICATIONS

International Search Report for PCT/KR2021/009116 mailed Oct. 25, 2021, 4 pages.
(Continued)

*Primary Examiner* — Mahendra R Patel
(74) *Attorney, Agent, or Firm* — Nixon & Vanderhye, P.C.

(57) ABSTRACT

An example electronic device may include a first camera including a first camera barrel accommodating a first lens assembly; a second camera including a second camera barrel accommodating a second lens assembly; a cover housing arranged to substantially cover the first camera and the second camera and including a first opening corresponding to the first camera barrel of the first camera and a second opening corresponding to the second camera barrel of the second camera; a camera window including a first transparent region formed in a portion thereof corresponding to the first opening and a second transparent region formed in a portion thereof corresponding to the second opening; a first decoration part disposed at the inner circumference of the first opening of the cover housing and having an inclination
(Continued)

formed at the inner circumferential portion thereof; and a second decoration part disposed at the inner circumference of the second opening of the cover housing and having an inclination formed at the inner circumferential portion thereof, wherein the first transparent region and the second transparent region of the camera window may have the same diameter, and the first decoration part and the second decoration part may have the same diameter.

15 Claims, 12 Drawing Sheets

(51) Int. Cl.
  *H04N 23/57* (2023.01)
  *H04N 23/68* (2023.01)
  *H04N 23/90* (2023.01)
(58) Field of Classification Search
  CPC .......... H04N 23/51; G03B 5/00; G03B 11/00; G03B 17/02; G03B 17/56; G03B 30/00; G03B 2205/0007
  USPC ...................................... 455/556.1
  See application file for complete search history.

(56) References Cited

U.S. PATENT DOCUMENTS

| | | | |
|---|---|---|---|
| 10,131,292 B2 * | 11/2018 | Oh .................... | B60R 11/04 |
| 10,425,561 B2 | 9/2019 | Jarvis et al. | |
| 10,635,137 B2 * | 4/2020 | Park .................... | G06F 1/1641 |
| 11,153,503 B1 * | 10/2021 | Ebrahimi Afrouzi .. | H04N 23/74 |
| 11,178,320 B2 * | 11/2021 | Noh .................... | H04M 1/0266 |
| 11,323,554 B2 * | 5/2022 | Ha .................... | H04M 1/0264 |
| 11,528,399 B2 * | 12/2022 | Queeney ............... | H04N 23/54 |
| 2007/0193901 A1 * | 8/2007 | Cohen .................... | A45C 11/38 |
| | | | 206/316.2 |
| 2010/0328219 A1 * | 12/2010 | Lombardi ............... | H04N 7/142 |
| | | | 345/169 |
| 2011/0255000 A1 * | 10/2011 | Weber .................. | B23K 26/351 |
| | | | 219/121.72 |
| 2013/0259461 A1 * | 10/2013 | Yoon .................... | G03B 15/05 |
| | | | 396/165 |
| 2013/0313672 A1 | 11/2013 | Min | |
| 2014/0063265 A1 * | 3/2014 | Shukla .................. | H04N 23/57 |
| | | | 348/374 |
| 2014/0253799 A1 * | 9/2014 | Moon .................... | H04N 23/57 |
| | | | 348/376 |
| 2016/0119520 A1 * | 4/2016 | Park .................... | H04N 23/57 |
| | | | 348/373 |
| 2016/0309069 A1 * | 10/2016 | Steinberg ............... | G03B 15/05 |
| 2017/0104901 A1 * | 4/2017 | Sanford ................ | H04N 23/56 |
| 2018/0024419 A1 | 1/2018 | Sheridan | |
| 2018/0196219 A1 | 7/2018 | O et al. | |
| 2018/0241861 A1 | 8/2018 | Kim et al. | |
| 2019/0052785 A1 * | 2/2019 | Ai .......................... | H04N 23/58 |
| 2019/0082083 A1 * | 3/2019 | Jarvis .................... | H04N 23/51 |
| 2019/0369678 A1 | 12/2019 | Park et al. | |
| 2020/0150387 A1 * | 5/2020 | Kim .......................... | G06T 7/586 |
| 2020/0348480 A1 * | 11/2020 | Kim .......................... | G02B 7/04 |
| 2021/0021801 A1 | 1/2021 | Lee et al. | |
| 2021/0136187 A1 * | 5/2021 | Jeon .................... | H04M 1/0264 |
| 2021/0405508 A1 | 12/2021 | Kim et al. | |
| 2022/0078317 A1 | 3/2022 | Wang et al. | |

FOREIGN PATENT DOCUMENTS

| | | | | |
|---|---|---|---|---|
| EP | 3168682 A1 * | 5/2017 | ........... | G02B 27/646 |
| JP | 2000250111 A * | 9/2000 | | |
| JP | 2007-181045 | 7/2007 | | |
| KR | 10-2015-0026419 | 3/2015 | | |
| KR | 10-2019-0020474 | 3/2019 | | |
| KR | 10-2019-0028284 | 3/2019 | | |
| KR | 10-2019-0119856 | 10/2019 | | |
| KR | 10-2031654 | 10/2019 | | |
| KR | 10-2172637 | 11/2020 | | |
| KR | 10-2306912 | 9/2021 | | |
| KR | 10-2377985 | 3/2022 | | |
| WO | WO-2015058153 A1 * | 4/2015 | ........... | G02B 13/001 |
| WO | WO-2016168838 A2 * | 10/2016 | ........... | G03B 13/06 |

OTHER PUBLICATIONS

Written Opinion of the ISA for PCT/KR2021/009116 mailed Oct. 25, 2021, 3 pages.

* cited by examiner

CAMERA STRUCTURE AND ELECTRONIC DEVICE COMPRISING CAMERA STRUCTURE

CROSS-REFERENCE TO RELATED APPLICATIONS

This application is a continuation of International Application No. PCT/KR2021/009116, designating the United States, filed on Jul. 15, 2021, in the Korean Intellectual Property Receiving Office and claiming priority to Korean Patent Application No. 10-2020-0090154, filed on Jul. 21, 2020, in the Korean Intellectual Property Office, the disclosures of which are incorporated by reference herein in their entireties.

BACKGROUND

Field

The disclosure relates to a camera structure and an electronic device including the camera structure.

Description of Related Art

Various types of cameras may be mounted on an electronic device. A plurality of cameras may be included in an electronic device to enable photographing in various photographing conditions (e.g., focal length, angle of view). A standard camera, a wide-angle camera, and a telephoto camera may be included in an electronic device, according to angle of view.

Such a plurality of cameras may be arranged to share one camera window. The camera window may be configured of a transparent material so that external light can be incident to the plurality of cameras.

SUMMARY

Various cameras may include different lens assemblies having different optical specifications. In a case in which the sizes of the lens assemblies are different from each other, the sizes of the barrels for accommodating the lens assemblies and the sizes of the bodies of the cameras may be different from each other.

When the sizes of a plurality of cameras are different from each other, the cameras may be viewed as having different shapes through a camera window shared by the plurality of cameras. Accordingly, the unity between the cameras may be reduced, thereby reducing external elegance and aesthetics of the electronic device.

In addition, if housings covering the cameras are machined into different sizes, machining cost and machining difficulties may increase.

Various embodiments disclosed herein may provide a camera structure in which cameras viewed through a camera window shared by the cameras have a sense of unity and aesthetics with each other and an electronic device including the camera structure.

An electronic device according to various example embodiments of the disclosure may include a first camera including a first camera barrel in which a first lens assembly is accommodated, a second camera including a second camera barrel in which a second lens assembly is accommodated, a cover housing including a first opening corresponding to the first camera barrel of the first camera and a second opening corresponding to the second camera barrel of the second camera and disposed to substantially cover the first camera and the second camera, a camera window including a first transparent area at a portion corresponding to the first opening and a second transparent area at a portion corresponding to the second opening and disposed on the cover housing, a first decoration unit disposed on an inner circumference of the first opening of the cover housing and having an inclination formed on the inner circumference thereof, and a second decoration unit disposed on an inner circumference of the second opening of the cover housing and having an inclination formed on the inner circumference thereof, wherein the diameters of the first transparent area and the second transparent area of the camera window may be the same with each other, and the diameters of the first decoration unit and the second decoration unit may be the same with each other.

A camera structure according to various example embodiments disclosed herein may include a first camera including a first camera barrel in which a first lens assembly is accommodated, a second camera including a second camera barrel in which a second lens assembly is accommodated, a cover housing including a first opening corresponding to the first camera barrel of the first camera and a second opening corresponding to the second camera barrel of the second camera and disposed to substantially cover the first camera and the second camera, a camera window including a first transparent area at a portion corresponding to the first opening and a second transparent area at a portion corresponding to the second opening and disposed on the cover housing, a first decoration unit configured to have a diameter decreasing away from the camera window and disposed on the inner circumference of the first opening of the cover housing, and a second decoration unit configured to have a diameter decreasing away from the camera window and disposed on the inner circumference of the second opening of the cover housing, wherein the diameters of the first transparent area and the second transparent area of the camera window may be the same with each other, and the diameters of the first decoration unit and the second decoration unit may be the same with each other.

According to various embodiments disclosed herein, a plurality of cameras included in the camera structure may be exposed to the outside in a unified shape to improve the external aesthetics of the camera structure. In addition, a three-dimensional effect of the outer appearances of cameras may be improved by including a configuration capable of providing a three-dimensional effect to a housing configured to cover the cameras.

In addition, by unifying the sizes of the portions where the cameras are viewed, the processing cost and difficulty may be reduced.

BRIEF DESCRIPTION OF THE DRAWINGS

In relation to the description of drawings, the same or similar reference numerals may be used for the same or similar components.

The above and other aspects, features and advantages of certain embodiments of the present disclosure will be more apparent from the following detailed description, taken in conjunction with the accompanying drawings, in which.

DETAILED DESCRIPTION

Figure 1:
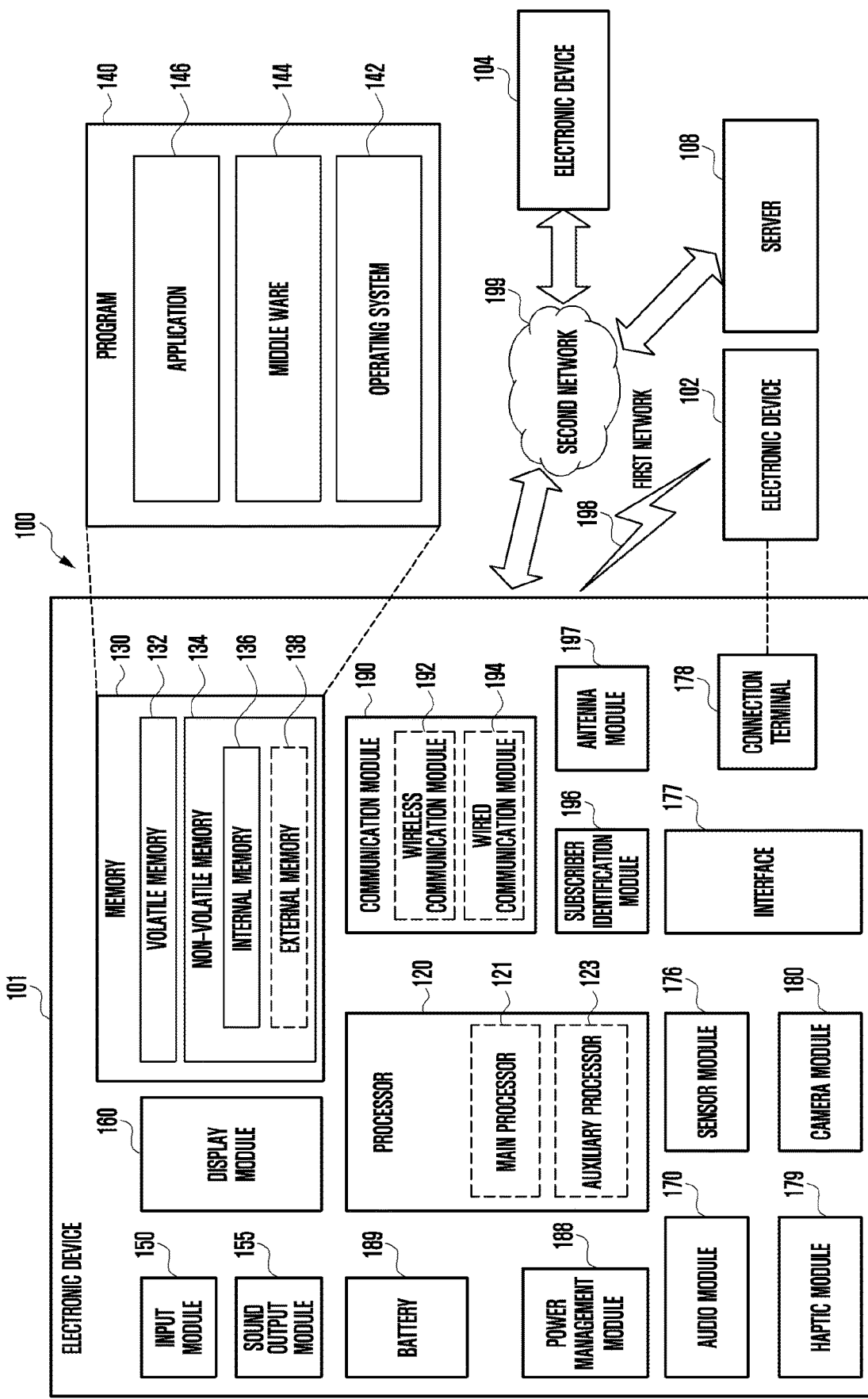
FIG. 1 is a block diagram illustrating an example electronic device in a network environment according to various embodiments.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the item, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish components from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
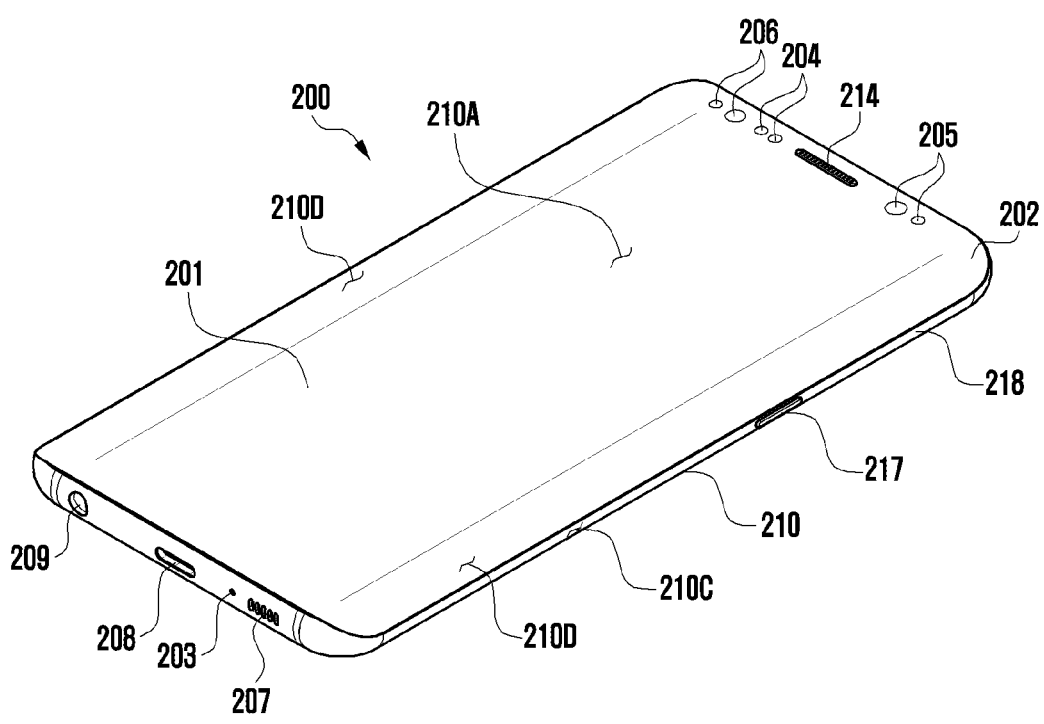
FIG. 2A is a perspective view illustrating a front surface of an example electronic device according to various embodiments.
Figure 2B:
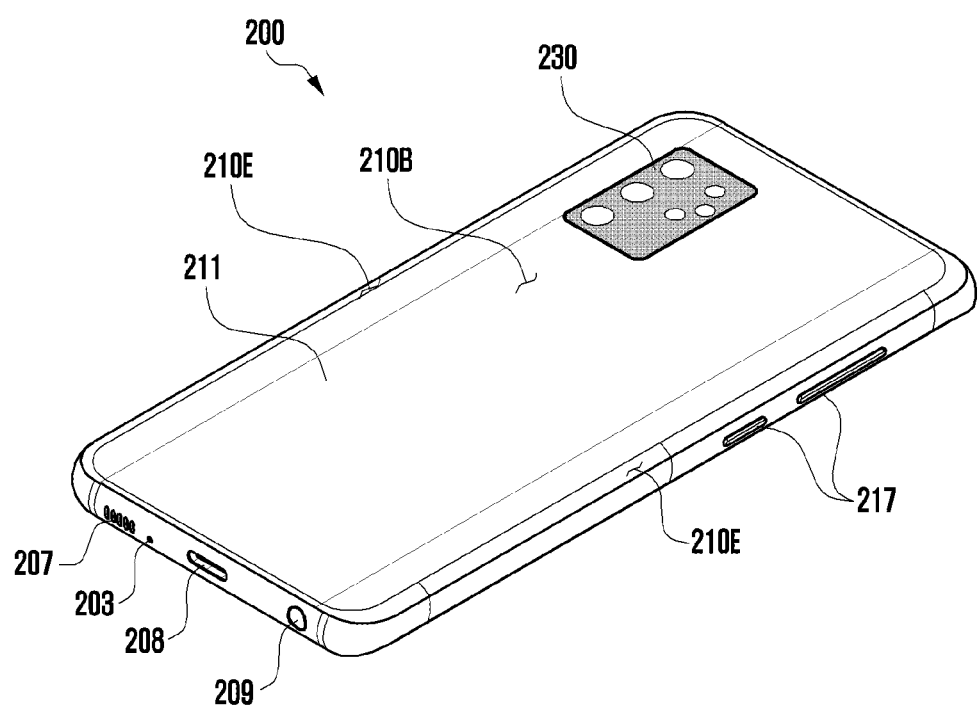
FIG. 2B is a perspective view illustrating a rear surface of the example electronic device illustrated in FIG. 2A.

FIG. 2A is a perspective view showing a front surface of an example electronic device according to various embodiments. FIG. 2B is a perspective view showing a rear surface of the example electronic device illustrated in FIG. 2A.

Referring to FIG. 2A and FIG. 2B, an electronic device 200 according to an embodiment may include a housing 210 including a first surface (or a front surface) 210A, a second surface (or a rear surface) 210B, and a side surface 210C configured to surround a space between the first surface 210A and the second surface 210B. In an embodiment (not shown), a housing may refer to a structure configuring the first surface 210A of FIG. 2A, the second surface 210B of FIG. 2B, and a portion of the side surface 210C. According to an embodiment, the first surface 210A may be configured by a front plate 202 of which at least a portion is substantially transparent. In an embodiment, the front plate 202 may be coupled to the housing 210 to configure an inner space together with the housing 210. In various embodiments, the inner space may refer to a space configured to accommodate at least a portion of a display 201 as an inner space of the housing 210.

According to various embodiments, the second surface 210B may be configured by a rear plate 211 which is substantially opaque. The rear plate 211 may be configured by, for example, coated or tinted glass, ceramic, polymer, metal (e.g., aluminum, stainless steel (STS), or magnesium), or a combination of at least two of the above materials. The side surface 210C may be coupled to the front plate 202 and the rear plate 211 and be configured by a side bezel structure (or "side member") 218 including a metal and/or a polymer. In various embodiments, the rear plate 211 and the side bezel structure 218 may be integrally configured and may include the same material (e.g., a metal material such as aluminum).

In an embodiment, the front plate 202 may include, at opposite ends of long edges of the front plate 202, two first areas 210D (e.g., curved areas) bended from the first surface 210A toward the rear plate 211 to extend seamlessly. In an embodiment, the rear plate 211 may include, at opposite ends of long edges thereof, two second areas 210E (e.g., curved areas) bended from the second surface 210B toward the front plate 202 to extend seamlessly. In various embodiments, the front plate 202 (or the rear plate 211) may include only one among the first areas 210D (or the second areas 210E). In an embodiment, a portion among the first areas 210D or the second areas 210E may not be included. In an embodiment, when viewed from the side surface of the electronic device 200, the side bezel structure 218 may have a first thickness (or width) at the side of a side surface (e.g., the side surface through which a connector hole 208 extends) which does not include the first areas 210D or the second areas 210E, and may have a second thickness smaller than the first thickness at the side of a side surface (e.g., the side surface on which a key input device 217 is disposed) including the first areas 210D or the second areas 210E.

According to an embodiment, the electronic device 200 may include at least one among a display 201, audio modules 203, 207, and 214, a sensor module 204, camera modules 205 and 230, a key input device 217, a light emitting element 206, and connector holes 208 and 209. In various embodiments, the electronic device 200 may omit at least one (e.g., a key input device 217 or a light emitting element 206) among components or additionally include other components.

The display 201 may be exposed, for example, through a considerable portion of the front plate 202. In various embodiments, at least a portion of the display 201 may be exposed through the front plate 202 configuring the first areas 210D of the first surface 210A and the side surface 210C. In various embodiments, the rim of the display 201 may be configured to be substantially the same as the shape of an adjacent outer periphery of the front plate 202. In an embodiment (not shown), the gap between the outer periphery of the display 201 and the outer periphery of the front plate 202 may be configured to be substantially the same, so as to expand the area to which the display 201 is exposed.

In an embodiment (not shown), a recess or an opening is disposed at a portion of a screen display area (e.g., an active area) or an area outside the screen display area (e.g., an inactive area) of the display 201, and at least one among an audio module 214, a sensor module 204, camera modules 205 and 230, and a light emitting element 206 aligned with the recess or the opening may be included. In an embodiment (not shown), at least one among an audio module 214, a sensor module 204, camera modules 205 and 230, and a light emitting element 206 may be included in the rear surface of the screen display area of the display 201. In an embodiment (not shown), the display 201 may be disposed to be coupled or adjacent to a touch detection circuit, a pressure sensor capable of measuring strength (pressure) of touch, and/or a digitizer configured to detect a magnetic stylus pen. In an embodiment, at least a portion of the sensor module 204 and/or at least a portion of the key input device 217 may be arranged at the first areas 210D and/or the second areas 210E.

The audio modules 203, 207, and 214 may include a microphone hole 203 and speaker holes 207 and 214. In the microphone hole 203, a microphone configured to acquire external sound may be disposed, and in various embodiments, a plurality of microphones may be arranged so as to detect the direction of sound. The speaker holes 207 and 214 may include an external speaker hole 207 and a receiver hole 214 for a call. In various embodiments, the speaker holes 207 and 214 and the microphone hole 203 may be implemented as one hole, or a speaker may be included without the speaker holes 207 and 214 (e.g., a piezo speaker).

The sensor module 204 may produce an electric signal or data value corresponding to an internal operating state of the electronic device 200 or an external environmental state. The sensor module 204 may include, for example, a first sensor module 204 (e.g., a proximity sensor) and/or a second sensor module (not shown) (e.g., a fingerprint sensor) arranged on the first surface 210A of the housing 210, and/or another sensor module (not shown) (e.g., a heart rate monitor (HRM) sensor or a fingerprint sensor) disposed on the second surface 210B of the housing 210. The fingerprint sensor may be disposed not only on the first surface 210A (e.g., a display 201) but also on the second surface 210B of the housing 210. The electronic device 200 may further include a sensor module not shown, for example, at least one among a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205 and 230 may include a first camera device 205 disposed on the first surface 210A and a second camera device 230 disposed on the second surface 210B of the electronic device 200. The camera modules 205 and 230 may include one or more lenses, image sensors, and/or image signal processors. In various embodiments, two or more lenses (infrared cameras, wide-angle and telephoto lenses) and image sensors may be arranged on one surface of the electronic device 200.

The key input device 217 may be disposed on a side surface 210C of the housing 210. In an embodiment, the electronic device 200 may not include some or all of the above-described key input devices 217, and the key input devices 217 not included may be implemented in other forms, such as soft keys, on the display 201.

The light emitting element 206, for example, may be disposed on the first surface 210A of the housing 210. The light emitting element 206 may provide, for example, state information of the electronic device 200 in the form of light. In an embodiment, the light emitting element 206 may provide, for example, a light source interlocked with the operation of the camera module 205. The light emitting element 206 may include, for example, an LED, an IR LED, and/or a xenon lamp.

The connector holes 208 and 209 may include a first connector hole 208 capable of receiving a connector (for example, a USB connector) configured to transmit and receive power and/or data to and from an external electronic device and/or a second connector hole (for example, an earphone jack) 209 capable of receiving a connector configured to transmit and receive an audio signal to and from an external electronic device.

Figure 3A:
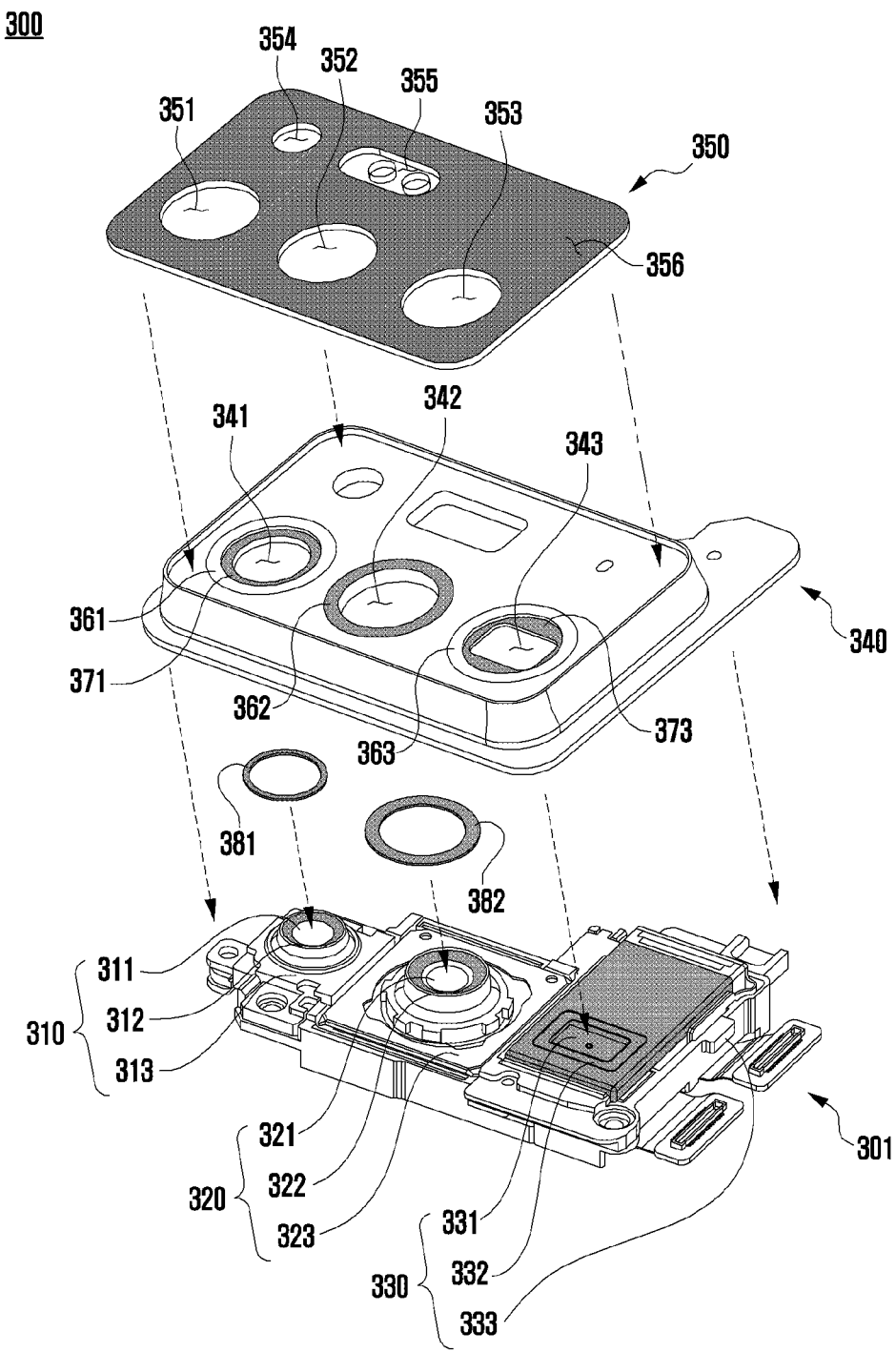
FIG. 3A is an exploded perspective view of an example camera structure according to various embodiments.
Figure 3B:
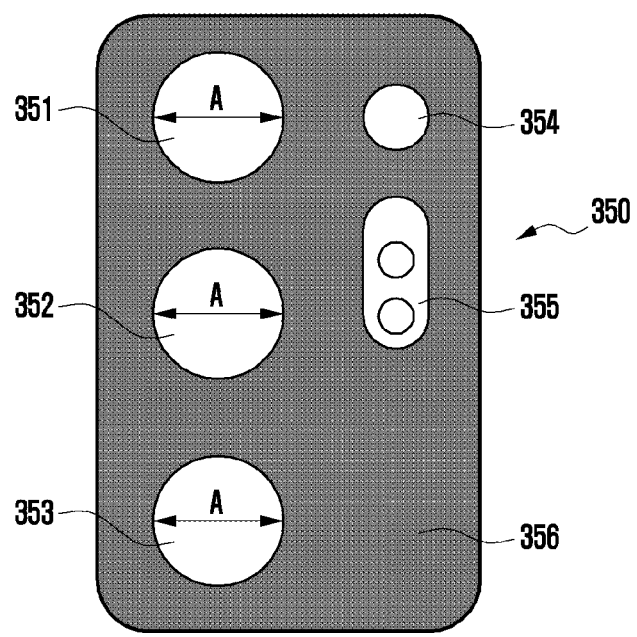
FIG. 3B is a plan view of the camera window illustrated in FIG. 3A.
Figure 3C:
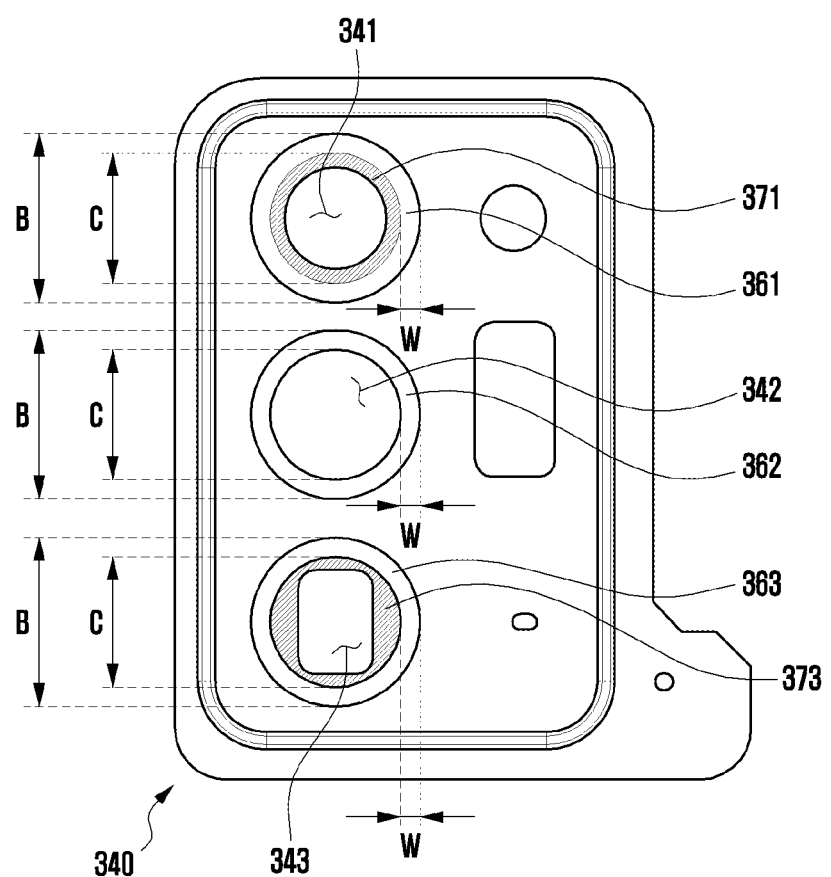
FIG. 3C is a plan view of the cover housing illustrated in FIG. 3A.
Figure 3D:
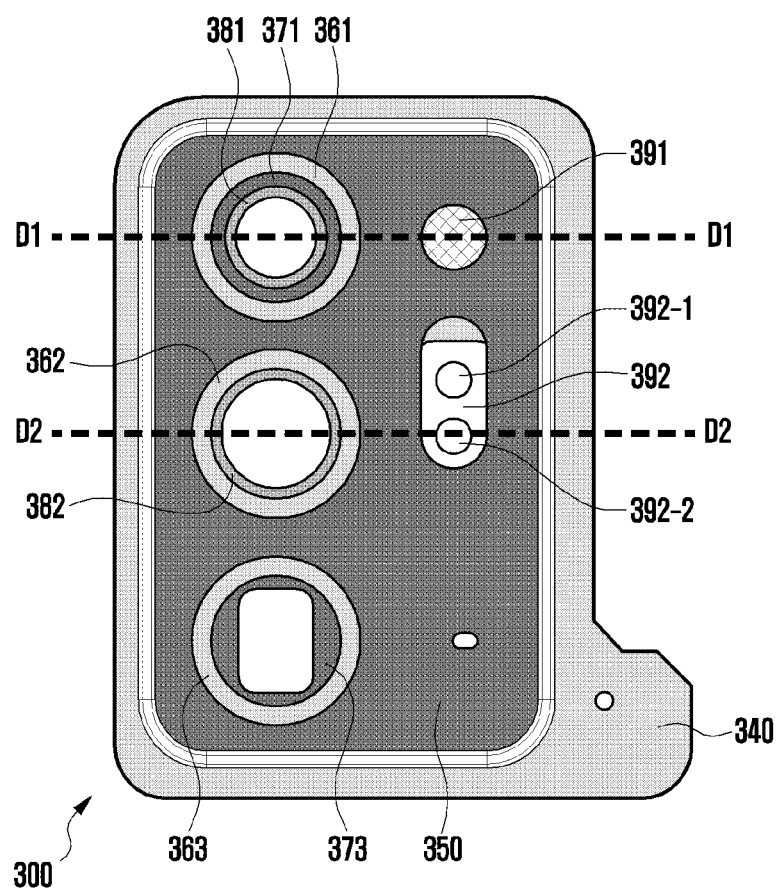
FIG. 3D is a plan view of the camera structure illustrated in FIG. 3A.

FIG. 3A is an exploded perspective view of an example camera structure according to various embodiments disclosed herein. FIG. 3B is a plan view of a camera window illustrated in FIG. 3A. FIG. 3C is a plan view of a cover housing illustrated in FIG. 3A. FIG. 3D is a plan view of the example camera structure illustrated in FIG. 3A.

According to various embodiments, a camera structure 300 (e.g., the second camera device 230 of FIG. 2B) may include a camera module 301, a light emitting unit 391, a cover housing 340, and a camera window 350. At least one of the components of the above-described camera structure 300 may be omitted, and the shape of the camera structure 300 is not limited to that shown in the drawings. According to an embodiment, the camera structure 300 may include two or four or more cameras. In the following description, it is assumed that the camera structure 300 includes three cameras (a first camera 310, a second camera 320, and a third camera 330).

According to various embodiments, the camera module 301 may include a first camera 310, a second camera 320, and a third camera 330. Each of the first camera 310, the second camera 320, and the third camera 330 may include an image sensor configured to convert light reflected from an object into an electrical signal. The image sensor may be, for example, a sensor such as a charge coupled device (CCD) and a complementary metal oxide semiconductor (CMOS). The first camera 310, the second camera 320, and the third camera 330 included in the camera module 301 may be cameras having different types or performing different functions. In an embodiment, the first camera 310, the second camera 320, and the third camera 330 may include different types of lens assemblies. For example, the first camera 310 may include a first lens assembly 311, the second camera 320 may include a second lens assembly 321, and the third camera 330 may include a third lens assembly 331. The lens assembly may refer, for example, to at least one optically disposed lens. The first lens assembly 311, the second lens assembly 321, and the third lens assembly 331 may be assemblies including lenses having different optical properties (e.g., angle of view, focal length, autofocus, f-number, and/or optical zoom). For example, the first lens assembly 311 of the first camera 310 may be a lens assembly capable of photographing an image with a first angle of view, the second lens assembly 321 of the second camera 320 may be a lens assembly capable of photographing an image with a second angle of view, and the third lens assembly 331 of the third camera 330 may be a lens assembly capable of photographing an image with a third angle of view. The first angle of view may be an angle of view generally classified as a wide angle in the field of cameras, the second angle of view may be an angle of view classified as a standard angle, and the third angle of view may be an angle of view classified as a zoom angle.

According to various embodiments, at least one camera among the first camera 310, the second camera 320, and the third camera 330 may include an optical image stabilizer (OIS) unit (not shown) configured to drive an OIS. The OIS unit may, for example, be a device configured to compensate shake of the electronic device (e.g., the electronic device 200 of FIG. 2A) in a photographing situation. The OIS unit can compensate the shake of the electronic device by moving an instrument (e.g., a camera barrel, a camera body) in which the lens assembly is accommodated. The OIS unit may be driven by various kinds of forces. For example, the OIS unit may be driven by electromagnetic force or magnetic force between a coil and a magnet, and may be driven by the driving force of an electric motor.

According to various embodiments, the first camera 310 may include a first camera body 313 configured to accommodate a printed circuit board on which an image sensor is disposed and accommodate other instruments of the first camera 310 and a first camera barrel 312 in which the first lens assembly 311 is accommodated. At least a portion of the first camera barrel 312 may be inserted into the first opening 341 of the cover housing 340.

According to various embodiments, the second camera 320 may include a second camera body 323 configured to accommodate a printed circuit board on which an image sensor is disposed and accommodate other instruments of the second camera 320 and a second camera barrel 322 in which the second lens assembly 321 is accommodated. At least a portion of the second camera barrel 322 may be inserted into the second opening 342 of the cover housing 340.

According to various embodiments, the third camera 330 may include a third camera body 333 configured to accommodate a printed circuit board on which an image sensor is disposed and accommodate other instruments of the third camera 330 and a third camera barrel 332 in which the third lens assembly 331 is accommodated.

According to various embodiments, the sizes of the first lens assembly 311, the second lens assembly 321, and the third lens assembly 331 may be different from one another, and thus the sizes of the first camera barrel 312, the second camera barrel 322, and the third camera barrel 332 may be different from one another. Therefore, a space between the first camera barrel 312 and the first decoration unit 361, a space between the second camera barrel 322 and the second decoration unit 362, and a space between the third camera barrel 332 and the third decoration unit 363 may all have different sizes. A first covering unit 371 may be disposed to fill at least a portion of the space between the first camera barrel 312 and the first decoration unit 361, and a third covering unit 373 may be disposed to fill at least a portion of the space between the third camera barrel 332 and the third decoration unit 363. In an embodiment, the size of the second camera barrel 322 may be substantially identical to that of the diameter of the inner circumference of the second decoration unit 362. Therefore, no covering unit may be disposed between the second camera barrel 322 and the second decoration unit 362. Details of the first covering unit 371 and the third covering unit 373 will be described later.

According to various embodiments, the first camera body 313 of the first camera 310, the second camera body 323 of the second camera 320, and the third camera body 333 of the third camera 330 may be at least partially integrated with or coupled to each other to configure the camera module 301.

According to various embodiments, the light emitting unit 391 (e.g., a light emitter) may produce light. The light emitting unit 391 may include an element (e.g., a light emitting element) capable of producing light. For example, the light emitting unit 391 may include an element such as a light emitting diode (LED), an injection laser diode (ILD), or a xenon lamp. In an embodiment, the light emitting unit 391 may operate in a photographing situation to add light in a dark photographing environment, thereby making it possible to take a picture with an appropriate shutter speed and sensitivity (e.g., international standard organization (ISO) value). In an embodiment, the light emitting unit 391 may operate alone to allow a user to use same as a flash.

According to various embodiments, a sensor unit 392 may be a sensor configured to measure a user's biometric information. For example, the sensor unit 392 may be a sensor (e.g., a photoplethysmography (PPG) sensor) configured to measure information related to a user's heartbeat. The sensor unit 392 may include a light emitting element 392-1 and a light receiving element 392-2. The sensor unit 392 may receive, through the light receiving element 392-2, light produced from the light emitting element 392-1 and reflected from the skin to measure information related to the heartbeat.

According to various embodiments, the cover housing 340 may be disposed to substantially cover the first camera 310, the second camera 320, and the third camera 330 included in the camera structure 300. At least a portion of the cover housing 340 may be supported by the first camera body 313 of the first camera 310, the second camera body 323 of the second camera 320, and the third camera body 333 of the third camera 330.

According to various embodiments, the cover housing 340 may include a first opening 341, a second opening 342, and a third opening 343. In an embodiment, the first opening 341 may correspond to the first camera barrel 312, the second opening 342 may correspond to the second camera barrel 322, and the third opening 343 may correspond to the third camera barrel 332. The size of the first opening 341 may be the same as or greater than the size of the first camera barrel 312, the size of the second opening 342 may be the same as or greater than the size of the second camera barrel 322, and the size of the third opening 343 may be the same as or greater than the size of the third camera barrel 332. For example, a portion of the first camera barrel 312 may be inserted into the first opening 341, and a portion of the second camera barrel 322 may be inserted into the second opening 342. External light may be incident on the first lens assembly 311 accommodated in the first camera barrel 312 through the first opening 341, external light may be incident on the second lens assembly 321 accommodated in the second camera barrel 322 through the second opening 342, and external light may be incident on the third lens assembly 331 accommodated in the third camera barrel 332 through the third opening 343.

According to various embodiments, the camera window 350 may be disposed in a partial area of the camera structure 300. According to an embodiment, the camera window 350 may be disposed at a portion where the camera structure 300 is exposed to the outside of the electronic device. At least partial area of the camera window 350 may be configured of a material having high light transmittance. For example, the camera window 350 may be configured of substantially transparent glass or synthetic resin. The camera window 350 may block external foreign substances from being introduced into the camera structure 300. The camera window 350 may be exposed to the external environment, and thus be formed of a material having good durability (e.g., hardness, strength, corrosion resistance). According to an embodiment, the camera window 350 may include a material capable of improving optical properties of the first camera 310, the second camera 320, and the third camera 330. This material may be disposed on the surface of the camera window 350 in a manner such as coating or printing.

According to various embodiments, the camera window 350 may be divided into a plurality of areas. For example, the camera window 350 may include a first transparent area 351 corresponding to the first opening 341 of the cover housing 340, a second transparent area 352 corresponding to the second opening 342 of the cover housing 340, a third transparent area 353 corresponding to the third opening 343 of the cover housing 340, a fourth transparent area 354 corresponding to the light emitting unit, a fifth transparent area 355 corresponding to the sensor unit, and an opaque area 356 excluding the first transparent area 351 to the fifth transparent area 355. In an embodiment, the camera window 350 is configured of a material having high transmittance such as glass, and a material having low transmittance may be disposed on the opaque area 356 excluding the first transparent area 351, the second transparent area 352, the third transparent area 353, the fourth transparent area, and the fifth transparent area 355 in a manner such as coating or printing. For example, a material having a high light absorption rate and thus having a black color may be disposed in the opaque area 356. In an embodiment, the camera window 350 may be configured of a composite material. For example, the opaque area 356 may be configured of a material having low transmittance, and the first transparent area 351, the second transparent area 352, the third transparent area 353, the fourth transparent area 354, and the fifth transparent area 355 may be configured of a material having high transmittance.

According to various embodiments, as illustrated in FIG. 3B, the sizes of the first transparent area 351, the second transparent area 352, and the third transparent area 353 may be the same. For example, as illustrated in FIG. 3B, in a case in which the first transparent area 351, the second transparent area 352, and the third transparent area 353 are substantially circular, the diameter A of the first transparent area 351, the diameter A of the second transparent area 352, and the diameter A of the third transparent area 353 may all be the same. For example, the diameter A of the first transparent area 351, the diameter A of the second transparent area 352, and the diameter A of the third transparent area 353 may be about 12.3 mm. In an embodiment, the diameter A of the first transparent area 351 may be the same as the diameter of the outer circumference of the first decoration unit 361 (the diameter B of the outer circumference of the first decoration unit 361 in FIG. 3C), the diameter A of the second transparent area 352 may be the same as the diameter of the outer circumference of the second decoration unit 362 (the diameter B of the outer circumference of the second decoration unit 362 in FIG. 3C), and the diameter A of the third transparent area 353 may be the same as the diameter of the outer circumference of the third decoration unit 363 (the diameter B of the outer circumference of the third decoration unit 363 in FIG. 3C). Due to the unity of the size, a plurality of cameras viewed through the camera window 350 may have aesthetic unity.

According to various embodiments, the camera structure 300 may include a first decoration unit 361, a second decoration unit 362, and a third decoration unit 363. The first decoration unit 361 may be disposed on the inner circumference of the first opening 341, the second decoration unit 362 may be disposed on the inner circumference of the second opening 342, and the third decoration unit 363 may be disposed on the inner circumference of the third opening 343. Referring to the cross-section (e.g., FIG. 4A) of the camera structure 300, side surfaces of the first decoration unit 361, the second decoration unit 362, and the third decoration unit 363 may have inclinations (e.g., may be sloped).

According to various embodiments, as illustrated in FIG. 3C, the first decoration unit 361, the second decoration unit 362, and the third decoration unit 363 may be configured in a ring shape. The sizes of the first decoration unit 361, the second decoration unit 362, and the third decoration unit 363 may be the same. For example, the diameter B of the outer circumference of the first decoration unit 361, the diameter B of the outer circumference of the second decoration unit 362, and the diameter B of the outer circumference of the third decoration unit 363 may be the same with one another, and the diameter C of the inner circumference of the first decoration unit 361, the diameter C of the inner circumference of the second decoration unit 362, and the diameter C of the inner circumference of the third decoration unit 363 may be the same with one another. The width W of the first decoration unit 361, the width W of the second decoration unit 362, and the width W of the third decoration unit 363 may also be the same. The width W may refer to the distance between the outer circumferential surface and the inner circumferential surface of the decoration unit. For example, the diameter B of the outer circumference of the decoration unit may be 12.3 mm, the diameter C of the inner circumference of the decoration unit may be 11 mm, and the width W of the decoration unit may be about 1.3 mm. The first decoration unit 361, the second decoration unit 362, and the third decoration unit 363 may be machined in the same way by a machining body of the same size, and thus external shapes of the decoration units may be the same.

According to various embodiments, the first decoration unit 361, the second decoration unit 362, and the third decoration unit 363 may be configured by machining the cover housing 340. For example, the first decoration unit 361, the second decoration unit 362, and the third decoration unit 363 may be configured by machining a portion of the cover housing 340 using a computerized numerical control (CNC) method. In an embodiment, the first decoration unit 361, the second decoration unit 362, and the third decoration unit 363 may be separately machined to be arranged on the cover housing 340.

According to various embodiments, the first covering unit 371 may be disposed on the inner circumference of the first decoration unit 361 such that at least a portion between the first camera barrel 312 and the first decoration unit 361 is filled. The third covering unit 373 may be disposed on the inner circumference of the third decoration unit 363 such that at least a portion between the third camera barrel 332 and the third decoration unit 363 is filled. The surface of the first covering unit 371 and the surface of the third covering unit 373 may be anodized. For example, the surface of the first covering unit 371 and the surface of the third covering unit 373 may be anodized with a material having low light transmittance. The first covering unit 371 and the third covering unit 373 may be omitted as necessary. For example, in a case in which the first camera 310 and the third camera 330 include an OIS unit, the first covering unit 371 and the third covering unit 373 may be omitted or the sizes thereof may be adjusted in consideration of driving of the OIS unit.

According to various embodiments, covering plates 381 and 382 (e.g., cover plate) may be fitted around at least one among the first camera barrel 312 of the first camera 310, the second camera barrel 322 of the second camera 320, and the third camera barrel 332 of the third camera 330. The covering plates 381 and 382 may be configured in a shape which may be fitted around the camera barrels. For example, as illustrated in FIG. 3A, in a case in which the covering plates are fitted around the first camera barrel 312 and the second camera barrel 322 configured in a cylindrical shape, the covering plates 381 and 382 are configured in a ring shape to be fitted around the first camera barrel 312 and the second camera barrel 322. The covering plates 381 and 382 may be configured of a material having low transmittance. In an embodiment, the width of the first covering plate 381 fitted around the first camera barrel 312 may be smaller than the width of the second covering plate 382 fitted around the second camera barrel 322.

Figure 4A:
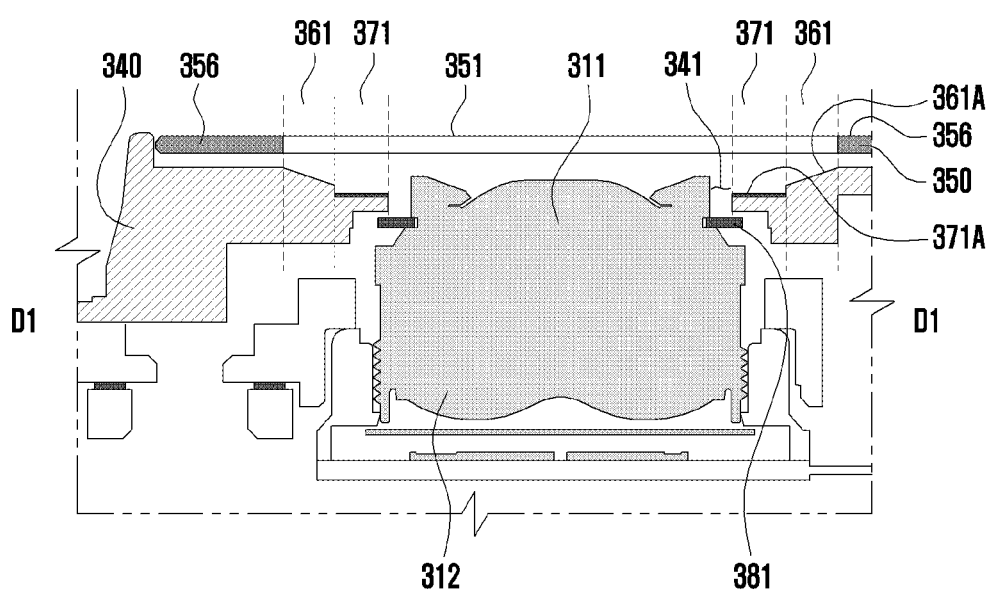
FIG. 4A is a cross-sectional view of the example camera structure taken along line D1-D1 of FIG. 3D.

FIG. 4A is a cross-sectional view of the camera structure taken along line D1-D1 of FIG. 3D.

According to various embodiments, the first camera barrel 312 of the first camera 310 may be disposed to allow at least a portion thereof to be inserted into the first opening 341 of the cover housing 340.

According to various embodiments, the first decoration unit 361 and the first covering unit 371 may be arranged at the first opening 341 of the cover housing 340. The inner circumference of the first decoration unit 361 may have an inclination (e.g., be sloped). The first decoration unit 361 may be configured to have a decreasing diameter. The first decoration unit 361 may be configured to have a diameter decreasing away from the camera window 350.

As illustrated in FIG. 4A, a first inclined surface 361A may be configured on the first decoration unit 361. For example, the first decoration unit 361 may include the first inclined surface 361A having an inclination of 17 degrees to 20 degrees. In an embodiment, the surface (a first inclined surface 361A) of the first decoration unit 361 may be anodized. The surface 361A of the first decoration unit 361, configured to have a gradually decreasing diameter, may provide a three-dimensional effect to a user. In an embodiment, a hair line may be formed on the surface 361A of the first decoration unit 361.

According to various embodiments, the first covering unit 371 may be disposed on the inner circumference of the first decoration unit 361. The first covering unit 371 may be configured to fill at least a portion of the space between the first decoration unit 361 and the first camera barrel 312. The first covering unit 371 may fill at least a portion of the section between the first decoration unit 361 and the first camera barrel 312 such that the space between the first decoration unit 361 and the first camera barrel 312 is not viewed through the first transparent area 351 of the camera window 350. A material (e.g., a black material) having low transmittance may be disposed on the surface 371A of the first covering unit 371. The surface 371A of the first covering unit 371 may be configured to have low transmittance by anodizing.

According to various embodiments, the first transparent area 351 of the camera window 350 may be disposed at a portion corresponding to the first camera 310. According to an embodiment, the diameter of the first transparent area 351 may be the same as the diameter of the outer circumference of the first decoration unit 361.

According to various embodiments, the first covering plate 381 may be fitted around the first camera barrel 312. The first covering plate 381 may fill at least a portion of the section between the first decoration unit 361 and the first camera barrel 312 such that the space between the first decoration unit 361 and the first camera barrel 312 is not viewed through the first transparent area 351 of the camera window 350.

According to various embodiments, a portion excluding the first lens assembly 311 of the first camera 310 may be shielded by the first covering unit 371 and the first covering plate 381.

Figure 4B:
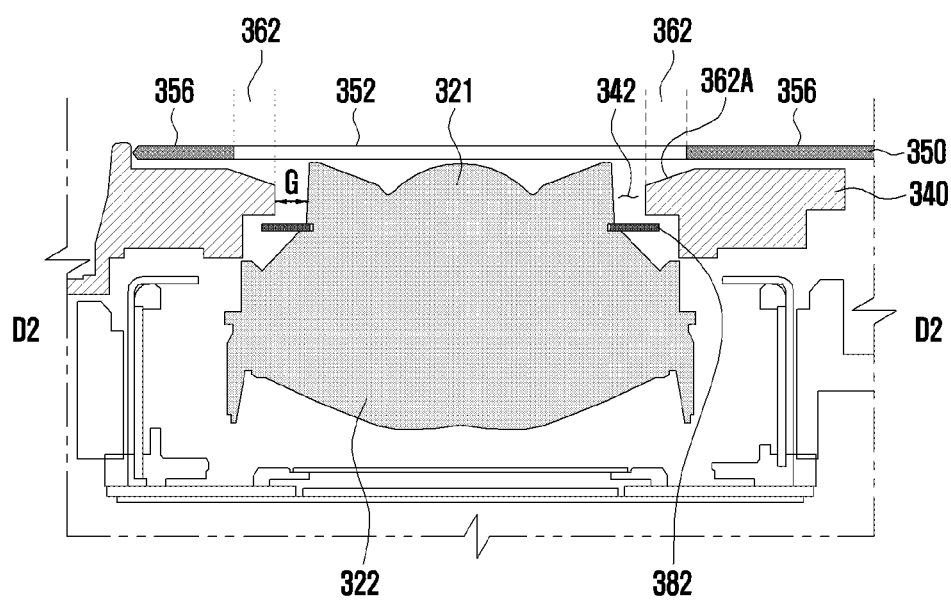
FIG. 4B is a cross-sectional view of the example camera structure taken along line D2-D2 of FIG. 3D.

FIG. 4B is a cross-sectional view of the camera structure taken along line D2-D2 of FIG. 3D.

According to various embodiments, the second camera barrel 322 of the second camera 320 may be disposed to allow at least a portion thereof to be inserted into the second opening 342 of the cover housing 340.

According to various embodiments, the second decoration unit 362 may be disposed on the second opening 342 of the cover housing 340. The inner circumference of the second decoration unit 362 may have an inclination (e.g., be sloped). The second decoration unit 362 may be configured to have a gradually decreasing diameter. The second decoration unit 362 may be configured to have a diameter decreasing away from the camera window 350.

As illustrated in FIG. 4B, a second inclined surface 362A may be configured on the second decoration unit 362. For example, the second decoration unit 362 may include the second inclined surface 362A having an inclination of about 15 degrees to 20 degrees. In an embodiment, the surface (the second inclined surface 362A) of the second decoration unit 362 may be anodized. The surface 362A of the second decoration unit 362, configured to have a gradually decreasing diameter, may provide a three-dimensional effect to a user. In an embodiment, a hair line may be formed on the surface 362A of the second decoration unit 362.

According to various embodiments, the second transparent area 352 of the camera window 350 may be disposed at a portion corresponding to the second camera 320. In an embodiment, the diameter of the second transparent area 352 may be the same as the diameter of the outer circumference of the second decoration unit 362.

According to an embodiment, the second camera barrel 322 of the second camera 320 may be disposed to be spaced a predetermined gap G apart from the second decoration unit 362. This may be in consideration of the movement of the second camera barrel 322 by the OIS driving of the second camera 320. For example, the gap G may be about 0.9 mm. The separation distance (gap G) between the second camera barrel 322 and the second decoration unit 362 may be at least greater than the operation range of the second camera barrel 322 by the OIS driving. In an embodiment, the second covering unit (not shown) may be disposed between the second camera barrel 322 and the second decoration unit 362. For example, in a case in which the second camera 320 does not include the OIS unit, the second covering unit may be disposed on the inner circumference of the second decoration unit 362 to fill the space between the second camera barrel 322 and the second decoration unit 362. In an embodiment, the second covering unit, of which the size has been adjusted to fill at least a portion of the section between the second camera barrel 322 and the second decoration unit 362, may be disposed on the inner circumference of the second decoration unit 362.

According to various embodiments, the second covering plate 382 may be fitted around the second camera barrel 322. The second covering plate 382 may fill at least a portion of the section between the second decoration unit 362 and the second camera barrel 322 such that the space between the second decoration unit 362 and the second camera barrel 322 is not viewed through the second transparent area 352 of the camera window 350. As illustrated in FIG. 4B, the second covering plate 382 may be configured to extend, so as to overlap the second decoration unit 362 in at least a partial section. Even though the second camera barrel 322 is moved by the OIS driving, the second covering plate 382 overlapping the second decoration unit 362 may block the space between the second decoration unit 362 and the second camera barrel 322 from being viewed to the outside through the second transparent area 352.

According to various embodiments, a portion excluding the second lens assembly 312 of the second camera 320 may be shielded by the second covering plate 382.

According to various embodiments, an inclination (e.g., slope) may be configured on the inner circumference of the third decoration unit 363 (see FIG. 3A) disposed on the third opening 343 (see FIG. 3A) of the cover housing 340 (see FIG. 3A). The third decoration unit may be configured to have a decreasing diameter. The third decoration unit may include a third inclined surface 361A, like the first inclined surface 361A of the first decoration unit 361 and the second inclined surface 362A of the second decoration unit 362. The third decoration unit 363 may be configured to have a diameter decreasing away from the camera window 350, similar to the first decoration unit 361 and the second decoration unit 362.

Figure 5:
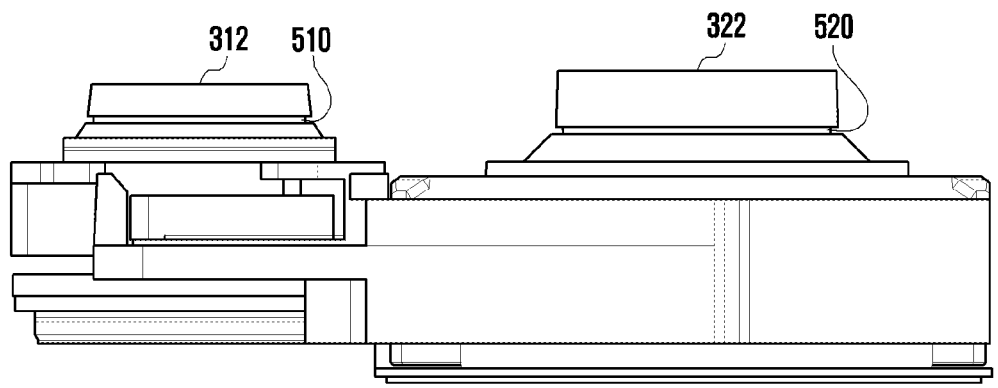
FIG. 5 is a side view of an example first camera and an example second camera according to various embodiments.
Figure 5:
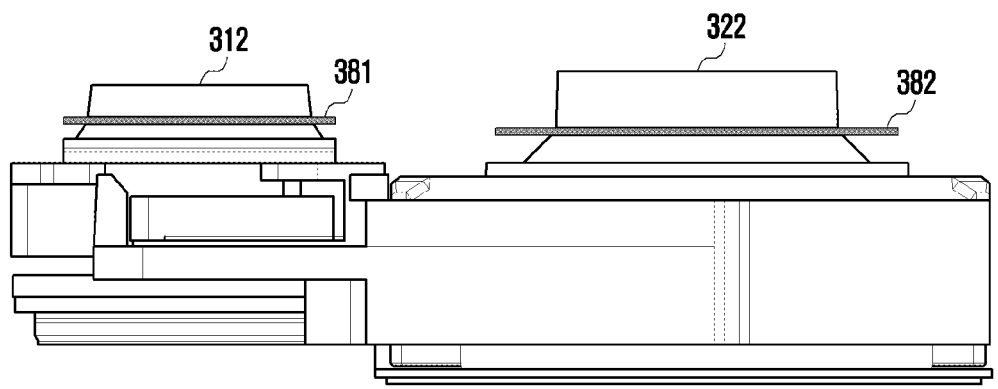

FIG. 5 is a side view of an example first camera and an example second camera according to various embodiments disclosed herein.

Reference numerals and descriptions of the same components as those described above among the components shown in FIG. 5 will not be repeated.

According to various embodiments, grooves 510 and 520 may be configured on the outer circumferences of the camera barrels (e.g., the first camera barrel 312 and the second camera barrel 322) around which the covering plates are fitted, to allow the covering plates to be fitted thereinto.

The first covering plate 381 may be fitted into a first groove 510 disposed on the first camera barrel 312 to be fixed in position, and the second covering plate 382 may be fitted into a second groove 520 configured on the second camera barrel 322 to be fixed in position.

According to various embodiments, the surfaces of the first covering plate 381 and the second covering plate 382 may be configured to be identical or similar to the surfaces of the first camera barrel 312 and the second camera barrel 322 so that the first camera barrel 312 and the second camera barrel 322 and the first covering plate 381 and the second covering plate 382 viewed through the camera window 350 have a sense of aesthetic unity.

Figure 6:
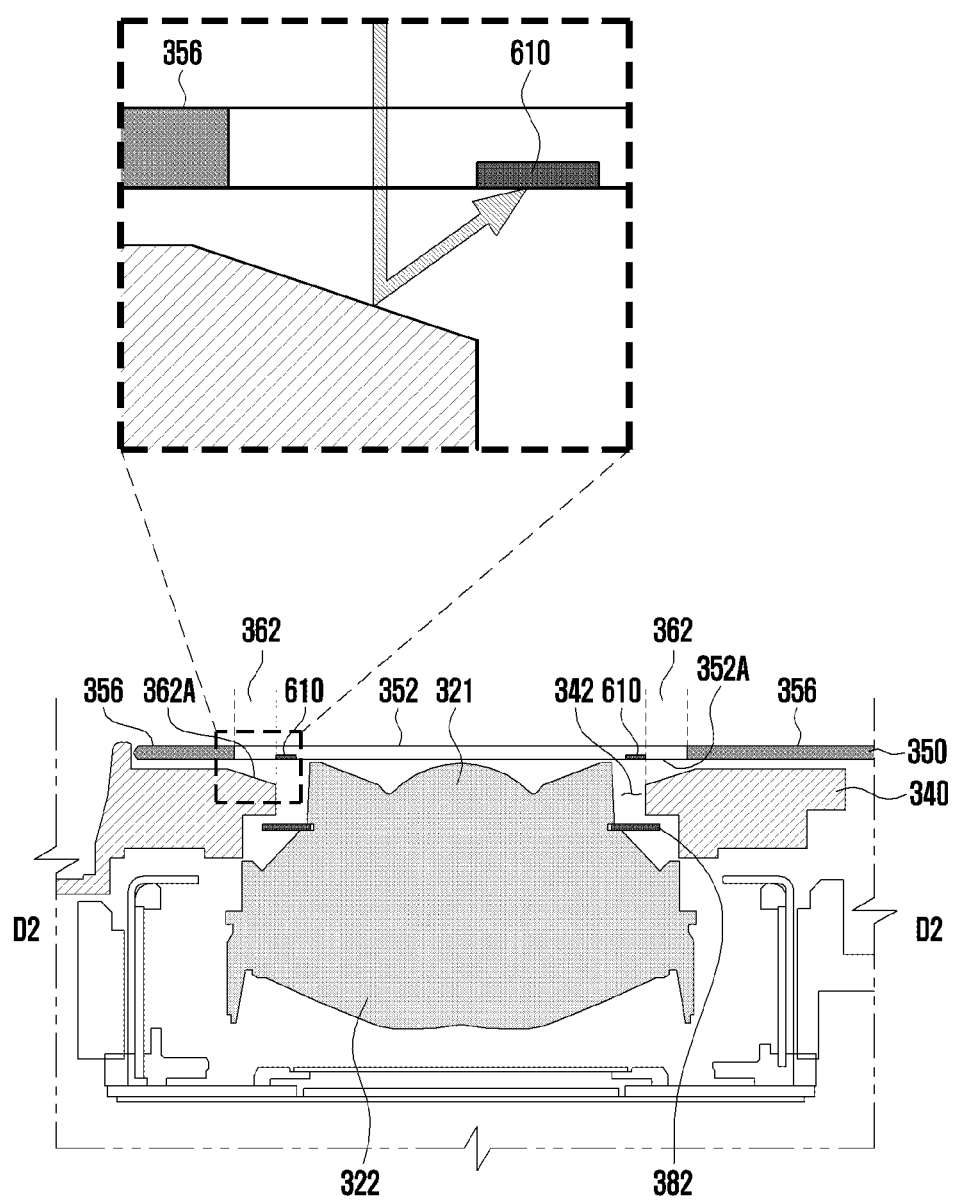
FIG. 6 is a cross-sectional view of an example camera structure according to various embodiments.

FIG. 6 is a cross-sectional view of an example camera structure according to various embodiments.

Detailed descriptions of the same components as those described above among the components shown in FIG. 6 will not be repeated.

According to various embodiments, a shielding unit 610 (e.g., shield) configured of a material capable of shielding light may be disposed on at least a portion of the surface (hereinafter, referred to as "the first surface 352A") facing the second camera 320 in the second transparent area 352 of the camera window 350. The shielding unit 610 may reduce a phenomenon in which light reflected from the second decoration unit 362 is partially reflected from the first surface 352A of the second transparent area 352 to be incident on the second lens assembly 321 of the second camera 320. The shielding unit 610 may shield light reflected from the second decoration unit 362 to reduce a phenomenon in which light is reflected from the first surface 352A of the second transparent area 352. The area in which the shielding unit 610 is disposed may be determined by a portion in which light reflected from the second decoration unit 362 reaches the first surface 352A of the second transparent area 352. According to the inclination of the second inclined surface 362A of the second decoration unit 362, the reflection angle of light reflected from the second decoration unit 362 may vary, and a portion at which the reflected light reaches the first surface 352A of the second transparent area 352 may vary. An area in which the shielding unit 610 is disposed may be adjusted according to the inclination (or the inclination angle) of the second inclined surface 362A of the second decorating unit 362. For example, in a case in which the inclination of the second decoration unit 362 is about 15 degrees to 20 degrees, the length of the shielding unit 610 may be about 0.5 mm.

In the above description, the shielding unit 610 has been described to be disposed in the second transparent area 352 for convenience of description, but the shielding unit 610 may also be disposed in the first transparent area 351 (see FIG. 3A) and the third transparent area 353 (see FIG. 3A).

Figure 7:
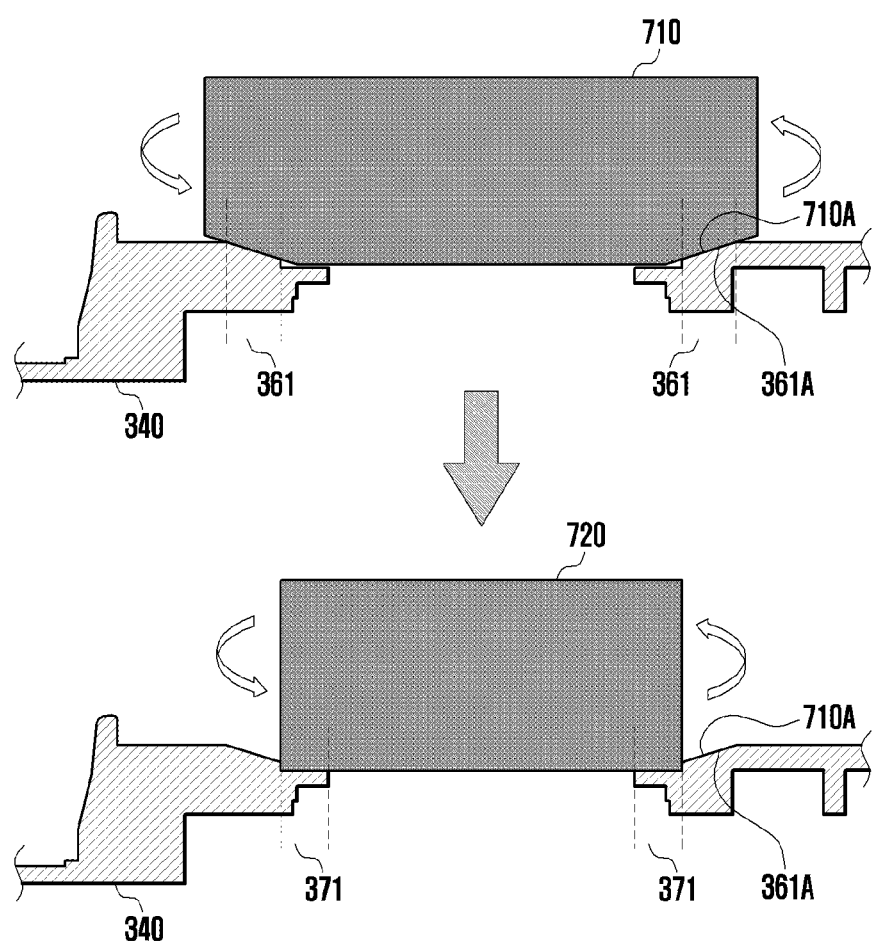
FIG. 7 is a view for explaining an example machining method of a decoration unit and a covering unit according to various embodiments.

FIG. 7 is a view for explaining a machining method of a decoration unit and a covering unit (e.g., cover) according to various embodiments disclosed herein. Hereinafter, descriptions will be made, with reference to the first decoration unit 361 and the first shielding unit 371. The second decoration unit 362, the third decoration unit 363, and the third covering unit 373 may be machined in the same manner as the first decoration unit 361 and the first covering unit 371.

According to various embodiments, the first decoration unit 361, the second decoration unit 362, and the third decoration unit 363 may be processed and configured by a first machining body 710 of the same size. For example, the diameter of the first machining body 710 may be greater than the diameters of the outer circumferences of the first decoration unit 361, the second decoration unit 362, and the third decoration unit 363. The first machining body 710 may include an inclined surface 710A such that the first inclined surface 361A of the first decoration part 361 is configured. The first machining body 710 may machine the cover housing 340 by rotation to configure the first decoration unit 361. The first decoration unit 361, the second decoration unit, and the third decoration unit 363 may be configured by using one machining body, and thus machining costs may be reduced. In addition, machining may be performed at once using the machining body greater than the first decoration unit 361, the second decoration unit 362, and the third decoration unit 363, and thus the first inclined surface 361A may be more uniformly configured. Since machining may be performed at once by using the machining body, the first inclined surface 361A may have a higher luminance than the surrounding instruments. Anodizing may be performed on the first inclined surface 361A of which the inclination is uniformly configured. By performing anodizing, the first decoration unit 361, the second decoration unit 362, and the third decoration unit 363 may have high reflectance (luminance).

According to various embodiments, the first covering unit 371 and the third covering unit 373 may be machined by a second machining body 720 having a diameter of which the size is the same as those of the diameters of the inner circumferences of the decoration units 361, 362, and 363. Surfaces of the first covering unit 371 and the third covering unit 373 may be configured to have low light transmittance via anodizing. The surfaces of the first covering unit 371 and the third covering unit 373 may be machined to configure inclinations.

An electronic device according to various embodiments disclosed herein may include a first camera including a first camera barrel in which a first lens assembly is accommodated, a second camera including a second camera barrel in which a second lens assembly is accommodated, a cover housing including a first opening corresponding to the first camera barrel of the first camera and a second opening corresponding to the second camera barrel of the second camera and disposed to substantially cover the first camera and the second camera, a camera window including a first transparent area at a portion corresponding to the first opening and a second transparent area at a portion corresponding to the second opening and disposed on the cover housing, a first decoration unit disposed on an inner circumference of the first opening of the cover housing and having an inclination formed on the inner circumference thereof, and a second decoration unit disposed on an inner circumference of the second opening of the cover housing and having an inclination formed on the inner circumference thereof, wherein the diameters of the first transparent area and the second transparent area of the camera window may be the same with each other, and the diameters of the first decoration unit and the second decoration unit may be the same with each other.

In addition, the first decoration unit, and the second decoration unit may be ring-shaped, the diameter of the outer circumference of the first decoration unit may be the same as the diameter of the first transparent area of the camera window, and the diameter of the outer circumference of the second decoration unit may be the same as the diameter of the second transparent area of the camera window.

In addition, the electronic device may further include a first cover disposed on the inner circumference of the first decoration unit to fill at least a portion of the section between the first camera barrel and the first decoration unit.

In addition, a surface of the first cover may be anodized to be configured to have low light transmittance.

In addition, the second camera may further include an optical image stabilizer (OIS) configured to move the second camera barrel, and may further include a cover plate fitted around the second camera barrel.

In addition, in the first transparent area of the camera window, a shield may be disposed in at least a partial area of the surface facing the first camera.

In addition, in the second transparent area of the camera window, a shield may be disposed in at least a partial area of the surface facing the second camera.

In addition, the first decoration unit and the second decoration unit may be configured such that a partial area of the cover housing is machined by a machining body having a diameter greater than the diameters of the first decoration unit and the second decoration unit.

In addition, the electronic device may further include a third camera including a third camera barrel in which a third lens assembly is accommodated, the cover housing may further include a third opening corresponding to the third camera barrel of the third camera, the camera window may further include a third transparent area at a portion corresponding to the third opening and may further include a third decoration unit disposed on the inner circumference of the third opening of the cover housing and having an inclination formed on the inner circumference thereof, the diameters of the first transparent area, the second transparent area, and the third transparent area of the camera window may be the same with each other, and the diameters of the first decoration unit, the second decoration unit, and the third decoration unit may be the same with each other.

In addition, the third decoration unit may be ring-shaped, and the diameter of the outer circumference of the third decoration unit may be the same as the diameter of the third transparent area.

In addition, the electronic device may further include a third cover disposed on the inner circumference of the third decoration unit to fill at least a portion of the section between the third camera barrel and the third decoration unit, and a surface of the third cover may be anodized to be configured to have low light transmittance.

In addition, the first decoration unit, the second decoration unit, and the third decoration unit may be configured such that a partial area of the cover housing is machined by a machining body have a diameter greater than the diameters of the first decoration unit, the second decoration unit, and the third decoration unit.

A camera structure according to various embodiments disclosed herein may include a first camera including a first camera barrel in which a first lens assembly is accommodated, a second camera including a second camera barrel in which a second lens assembly is accommodated, a cover housing including a first opening corresponding to the first camera barrel of the first camera and a second opening corresponding to the second camera barrel of the second camera and disposed to substantially cover the first camera and the second camera, a camera window including a first transparent area at a portion corresponding to the first opening and a second transparent area at a portion corresponding to the second opening and disposed on the cover housing, a first decoration unit configured to have a diameter decreasing away from the camera window and disposed on the inner circumference of the first opening of the cover housing, and a second decoration unit configured to have a diameter decreasing away from the camera window and disposed on the inner circumference of the second opening of the cover housing, wherein the diameters of the first transparent area and the second transparent area of the camera window may be the same with each other, and the diameters of the first decoration unit and the second decoration unit may be the same with each other.

In addition, the first decoration unit and the second decoration unit may be ring-shaped, the diameter of the outer circumference of the first decoration unit may be the same as the diameter of the first transparent area of the camera window, and the diameter of the outer circumference of the second decoration unit may be the same as the diameter of the second transparent area of the camera window.

In addition, the camera structure may further include a first cover disposed on the inner circumference of the first decoration unit to fill at least a portion of the section between the first camera barrel and the first decoration unit.

In addition, the surface of the first cover may be anodized to be configured to have low light transmittance.

In addition, the second camera may further include an optical image stabilizer (OIS) configured to move the second camera barrel, and may further include a cover plate fitted around the second camera barrel.

In addition, in the second transparent area of the camera window, a shield may be disposed in at least a partial area of the surface facing the second camera.

In addition, the camera structure may further include a third camera including a third camera barrel in which a third lens assembly is accommodated, the cover housing may further include a third opening corresponding to the third camera barrel of the third camera, the camera window may further include a third transparent area at a portion corresponding to the third opening and may further include a third decoration unit configured to have a diameter decreasing away from the camera window to be disposed on the inner circumference of the third opening of the cover housing and a third cover disposed on the inner circumference of the third decoration unit so as to fill the space between the third camera barrel and the third decoration unit, the diameters of the first transparent area, the second transparent area, and the third transparent area of the camera window may be the same with each other, the diameters of the first decoration unit, the second decoration unit, and the third decoration unit may be the same with each other, and the surface of the third covering unit may be anodized to be configured to have low light transmittance.

In addition, the first decoration unit, the second decoration unit, and the third decoration unit may be configured such that a partial area of the cover housing is machined by a machining body having a diameter greater than the diameters of the first decoration unit, the second decoration unit, and the third decoration unit.

The embodiments disclosed in the specification and drawings in the disclosure are merely presented as specific examples to easily describe the technical contents according to the embodiments disclosed herein and to help understanding of the embodiments disclosed herein, and are not intended to limit the scope of the embodiments disclosed herein. Therefore, the scope of various embodiments disclosed herein should be construed to include, in addition to the embodiments disclosed herein, all changes or modifications derived based on the technical ideas of various embodiments disclosed herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first camera comprising a first camera barrel accommodating a first lens assembly;
a second camera comprising a second camera barrel accommodating a second lens assembly;
a cover housing disposed to substantially cover the first camera and the second camera and comprising a first opening corresponding to the first camera barrel of the first camera and a second opening corresponding to the second camera barrel of the second camera;
a camera window disposed on the cover housing and comprising a first transparent area at a portion corresponding to the first opening and a second transparent area at a portion corresponding to the second opening;
a first decoration unit disposed on an inner circumference of the first opening of the cover housing and having an inclination formed on the inner circumference thereof; and
a second decoration unit disposed on an inner circumference of the second opening of the cover housing and having an inclination formed on the inner circumference thereof,
wherein diameters of the first transparent area and the second transparent area of the camera window are the same with each other, and
wherein diameters of the first decoration unit and the second decoration unit are the same with each other.

2. The electronic device of claim 1, wherein the first decoration unit and the second decoration unit are ring-shaped,
wherein a diameter of an outer circumference of the first decoration unit is the same as a diameter of the first transparent area of the camera window, and
wherein a diameter of an outer circumference of the second decoration unit is the same as a diameter of the second transparent area of the camera window.

3. The electronic device of claim 2, further comprising a first cover disposed on the inner circumference of the first decoration unit to fill at least a portion of a section between the first camera barrel and the first decoration unit.

4. The electronic device of claim 3, wherein a surface of the first cover is anodized to have low light transmittance.

5. The electronic device of claim 1, wherein the second camera further comprises an optical image stabilizer (OIS) configured to move the second camera barrel and further comprises a cover plate fitted around the second camera barrel.

6. The electronic device of claim 1, wherein, in the first transparent area of the camera window, a shield is disposed in at least a partial area of a surface facing the first camera.

7. The electronic device of claim 1, wherein, in the second transparent area of the camera window, a shield is disposed in at least a partial area of a surface facing the second camera.

8. The electronic device of claim 1, wherein the first decoration unit and the second decoration unit are configured such that a partial area of the cover housing is machinable by a machining body having a diameter greater than the diameters of the first decoration unit and the second decoration unit.

9. The electronic device of claim 1, further comprising a third camera comprising a third camera barrel accommodating a third lens assembly,
wherein the cover housing further comprises a third opening corresponding to the third camera barrel of the third camera,
wherein the camera window further comprises:
a third transparent area at a portion corresponding to the third opening; and
a third decoration unit disposed on an inner circumference of the third opening of the cover housing and having an inclination formed on the inner circumference thereof,
wherein diameters of the first transparent area, the second transparent area, and the third transparent area are the same with each other, and
wherein diameters of the first decoration unit, the second decoration unit, and the third decoration unit are the same with each other.

10. The electronic device of claim 9, wherein the third decoration unit is ring-shaped, and
wherein a diameter of an outer circumference of the third decoration unit is the same as a diameter of the third transparent area.

11. The electronic device of claim 10, further comprising a third cover disposed on an inner circumference of the third decoration unit to fill at least a portion of a section between the third camera barrel and the third decoration unit,
wherein a surface of the third cover is anodized to have low light transmittance.

12. The electronic device of claim 9, wherein the first decoration unit, the second decoration unit, and the third decoration unit are configured such that a partial area of the cover housing is machinable by a machining body having a diameter greater than the diameters of the first decoration unit, the second decoration unit, and the third decoration unit.

13. A camera structure comprising:
a first camera comprising a first camera barrel accommodating a first lens assembly;
a second camera comprising a second camera barrel accommodating a second lens assembly accommodated;
a cover housing disposed to substantially cover the first camera and the second camera and comprising a first opening corresponding to the first camera barrel of the first camera and a second opening corresponding to the second camera barrel of the second camera;
a camera window disposed on the cover housing and comprising a first transparent area at a portion corresponding to the first opening and a second transparent area at a portion corresponding to the second opening;
a first decoration unit configured to have a diameter decreasing away from the camera window and disposed on an inner circumference of the first opening of the cover housing; and
a second decoration unit configured to have a diameter decreasing away from the camera window and disposed on an inner circumference of the second opening of the cover housing,
wherein diameters of the first transparent area and the second transparent area of the camera window are the same with each other, and
wherein diameters of the first decoration unit and the second decoration unit are the same with each other.

14. The camera structure of claim 13, further comprising a first cover disposed on the inner circumference of the first decoration unit to fill at least a portion of a section between the first camera barrel and the first decoration unit.

15. The camera structure of claim 13, wherein the second camera further comprises an optical image stabilizer (OIS) configured to move the second camera barrel, and further comprises a cover plate fitted around the second camera barrel.

* * * * *